No. 806,360. PATENTED DEC. 5, 1905.
H. M. PERRY.
SIDE BEARING FOR CARS.
APPLICATION FILED NOV. 27, 1903.
2 SHEETS—SHEET 1.
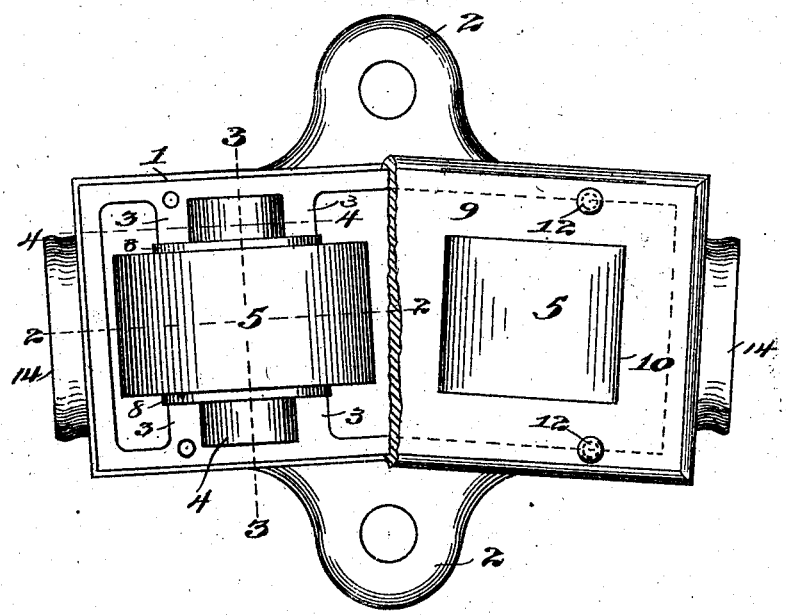
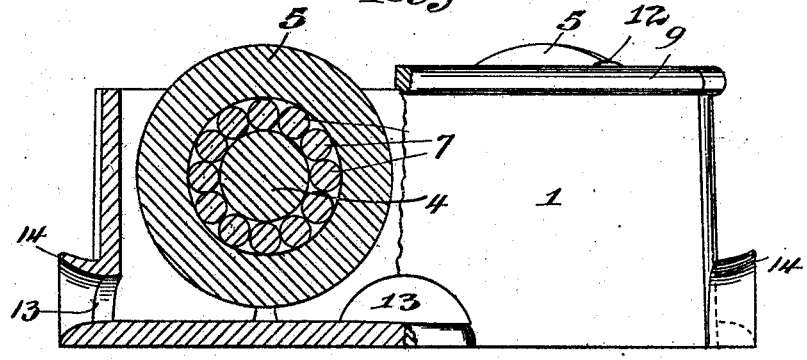
Witnesses,
Inventor,
Hubert M. Perry No. 806,360. PATENTED DEC. 5, 1905.
H. M. PERRY.
SIDE BEARING FOR CARS.
APPLICATION FILED NOV. 27, 1903.
2 SHEETS—SHEET 2.
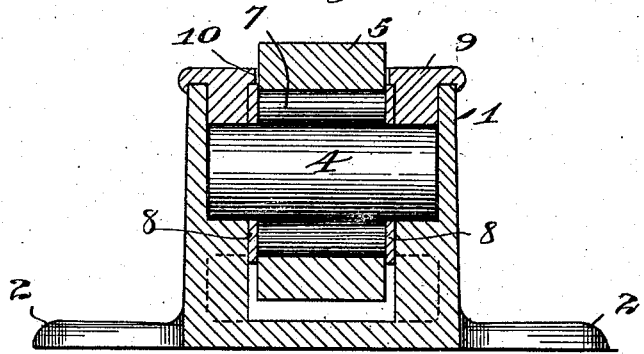
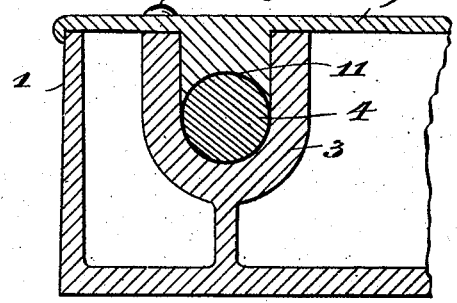
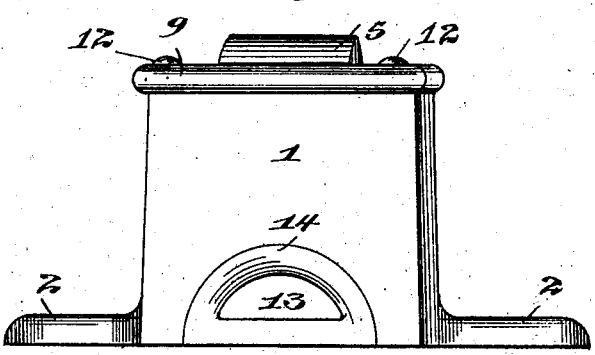
Witnesses,
Inventor,
Hubert M. Perry
By Offield Towle & Linthicum
Attys.

UNITED STATES PATENT OFFICE.

HUBERT M. PERRY, OF JOLIET, ILLINOIS, ASSIGNOR TO HENRY D. LAUGHLIN, OF JOLIET, ILLINOIS.

SIDE BEARING FOR CARS.

No. 806,360.      Specification of Letters Patent.      Patented Dec. 5, 1905.

Application filed November 27, 1903. Serial No. 182,798.

*To all whom it may concern:*

Be it known that I, HUBERT M. PERRY, of Joliet, county of Will, and State of Illinois, have invented certain new and useful Improvements in Side Bearings for Cars, of which the following is a specification.

This invention relates to improvements in side bearings of the antifriction type, and has for its object to provide improvements in the details of construction of side bearings of the general character set forth in my prior patents, No. 672,648, granted April 23, 1901, and No. 728,757, granted May 19, 1903.

Among the further objects of the invention are to provide an improved construction of the character referred to devoid of springs and the like; to provide a construction wherein the movement of the rollers is limited to their rotary movement; to provide a construction the rollers of which comprise a combination of rollers moving upon one another, said combination being capable of being assembled before being placed in their bearings; to provide improved means to prevent the displacement of said rollers; to provide a roller-bearing of such construction that no lubrication is necessary; to provide in a roller-bearing of the general character referred to air-passages so arranged that the passing of the air therethrough keeps the dust and dry accumulations removed therefrom, and in general to provide a cheap, compact, practical, and convenient bearing of the character referred to.

The invention consists in the matters hereinafter described, and more particularly pointed out in the appended claims, and will be readily understood from the following description, reference being had to the accompanying drawings, in which—

Figure 1 is a top plan view of a bearing embodying the invention with a part of the top plate broken away. Fig. 2 is a view partly in side elevation and partly in longitudinal vertical section, the sectional portion being taken on line 2 2, Fig. 1. Fig. 3 is a transverse sectional view taken on line 3 3, Fig. 1. Fig. 4 is a fragmentary sectional view on line 4 4, Fig. 1. Fig. 5 is an end elevation.

Referring to the drawings, 1 designates as a whole a box-like base member provided with suitable parallel lugs 2, by means of which it may be rigidly mounted upon a bolster, the general form of said base member being that of an oblong and approximately rectangular box slightly curved throughout its length or transversely angled a very slight degree at its center to conform more perfectly to the arc of oscillation of that part of the bolster upon which it is mounted. Upon the inside walls of said box-like base, oppositely disposed with relation to each other and formed integrally with said walls, are two pairs of inwardly-projecting forks or U-shaped bearing-lugs or supports 3, (shown in outline in Fig. 4,) the distance to which they project inwardly being their thickness, as shown in Fig. 1.

4 designates a journal, the ends of which are adapted to be supported in the forks of these bearing-supports 3, and 5 designates a hollow roller or cylinder, through which is passed the journal 4. The inside of said cylinder is somewhat larger than the journal 4 to provide therebetween the space 6, within which around the journal 4 is mounted a series of smaller rollers 7, which occupy said space and constitute a roller-bearing between the cylinder 5 and the journal 4.

The lengths of the cylinder and the rollers are the same and slightly less than the distance between the projecting edges of the opposite bearing-supports 3. Upon the journal 4 and engaging the ends of the rollers 7 and of the cylinder 5 are placed two steel washers 8 8, which serve to confine the rollers 7 within the cylinder 5 and also as a bearing-surface between the ends of the rollers and of the cylinder and the inner edges of the bearing-supports 3 when all are assembled and placed in position within the box-like base member 1, the ends of the journal 4 resting within the fork-shaped bearing-supports 3.

9 designates a top plate or cover of the casing or base member, having therein the rectangular apertures 10, through which protrudes the cylinder 5 as it revolves. Upon the under side of the top plate or cover 9, adapted to register with the forks of the bearing-supports 3, are two pairs of downwardly-projecting lugs, having concaved end surfaces 11. These lugs fit between the arms of the fork-shaped supports with the concaved end surfaces fitting over and partially around the upper half of the journal and constituting, with the fork-shaped bearing-supports, a completely-surrounding bearing-socket for each end of the journal 4. Said top plate is firmly secured to the box-like base member by means of the screws 12.

It will thus be seen that the rollers are confined within the base member, each bearing constituting a combination of rollers moving one upon the other, it being understood, of course, that all of said rollers and cylinder are made of steel or analogous substance and are confined in their movements to a revolving movement, thereby affording an effective roller-bearing for the car, as it moves over the protruding portions of the cylinders 5, which in turns revolves on the rollers 7 around the journal 4, said journal being loose enough that it can move should there be any undue friction or binding of the parts moving thereupon. The washers 8 8 are placed loosely upon the ends of the journal and only revolve as the journal revolves or as they are carried around by the friction of the ends of the rollers 7 moving thereagainst.

Another feature of importance in the present invention is the provision of air-passages through the lower portion of the box-like base member by means of the openings 13 at the ends and sides of said base member, provided with mouthpieces 14, which catch the air and direct it through the base member in a direction contrary to the direction of the movement of the car, thus carrying out of the bottom of said box-like base member all dust and dry accumulations which may settle therein, especially what dust may be formed by the ends of the rollers against the washers or of the washers against the edges of the bearing-supports, as they move one against the other, the dust being sifted down through joint between the washers and the bearing-support forks and the washers and the rollers. By thus keeping the dust removed from the base and providing a construction in which it is allowed to sift out of the way of the rollers an always-clean roller-bearing is produced, which does away with the necessity of lubricants and the like and provides an antifriction roller-bearing which will last the lifetime of a car without special attention or lubrication.

While I have herein described and shown a practical application of the invention, it is obvious that modifications may be made in the details of construction without departing from the spirit of the invention, and I do not, therefore, limit the invention to the details herein shown and described except in so far as these details are made the subject-matter of specific claims.

I claim—

1. A side bearing for cars comprising a box-like base member, a journal mounted therein, an integral open-ended cylinder mounted upon said journal, a series of rollers mounted within said cylinder around said journal, a pair of washers mounted upon said journal at the ends of said rollers and constituting smooth confining bearings therefor, and a top plate provided with apertures through which said cylinders revolubly protrude, said top plate overlying the upper edges of said washers and provided with integrally-formed lugs having curved bearing-surfaces overlying and confining said journal, substantially as described.

2. A side bearing for cars, comprising in combination, a box-like base member provided with air-passages therethrough, bearing-supports upon the inner walls of said base member, a journal mounted within said bearing-supports, an open-ended cylinder mounted upon said journal between said bearing-supports, a series of rollers mounted within said cylinder around said journal and moving thereupon, a pair of washers mounted upon said journal and confining said rollers within said cylinder and also forming smooth bearings for the ends of said rollers, a top plate secured to said base member and overlying the upper edges of said washers and provided with an aperture through which said cylinder revolubly protrudes, and lug members upon the under side of said top plate fitting between said washers and the wall of said box-like base over said journal and confining same in its bearings, substantially as described.

HUBERT M. PERRY.

Witnesses:
ALBERT H. GRAVES,
FREDERICK C. GOODWIN.